US008674269B2

(12) United States Patent
Humphrey et al.

(10) Patent No.: US 8,674,269 B2
(45) Date of Patent: Mar. 18, 2014

(54) SAFE PRODUCT TRANSFER APPARATUS

(75) Inventors: James E. Humphrey, Cheyenne, WY (US); Anthony Kukla, Fort Collins, CO (US); Diosdado Pangan, Cheyenne, WY (US)

(73) Assignee: Standex International Corporation, Salem, NH (US)

( * ) Notice: Subject to any disclaimer, the term of this patent is extended or adjusted under 35 U.S.C. 154(b) by 144 days.

(21) Appl. No.: 13/136,624

(22) Filed: Aug. 5, 2011

(65) Prior Publication Data

US 2011/0297012 A1 Dec. 8, 2011

Related U.S. Application Data

(63) Continuation-in-part of application No. 12/925,333, filed on Oct. 19, 2010.

(60) Provisional application No. 61/279,636, filed on Oct. 23, 2009.

(51) Int. Cl.
*F27D 11/00* (2006.01)
*A23C 3/02* (2006.01)

(52) U.S. Cl.
USPC ........... 219/442; 219/214; 219/469; 219/470; 219/471; 99/483; 99/341; 99/441; 99/427; 99/444; 99/443 R; 99/393; 99/395; 126/194; 126/190; 126/191

(58) Field of Classification Search
USPC ............ 219/442, 214, 469–471; 99/483, 341, 99/441, 427, 444, 443 R, 393, 395; 126/190–1, 194
See application file for complete search history.

(56) References Cited

U.S. PATENT DOCUMENTS 6,782,802 B2 * 8/2004 Hunot et al. .................... 99/341

* cited by examiner

*Primary Examiner* — Shawntina Fuqua
(74) *Attorney, Agent, or Firm* — William B. Ritchie

(57) ABSTRACT

A safe product transfer apparatus that heats refrigerated food products and then hold those heated food products in a hold drawer until they can be transferred to a heater merchandizer, preferably a roller grill as needed. The apparatus features a control assembly. A pre-heat indicator indicates when the preheat temperature has been reached so that the food products can be loaded into an operable drawer. The apparatus can heat a refrigerated product from 34° F. to greater than or equal to 140° F. in 35 minutes or less. The apparatus has a safe product transfer apparatus that has a heating cavity ranging from 250° F. to 425° F. The apparatus provides a safe product transfer apparatus that can hold the products stored therein at a safe holding temperature (ranging from greater or equal to 140° F. to not more than 205° F.), that is, not hot enough to continue heating or degrading the food product.

15 Claims, 11 Drawing Sheets

SAFE PRODUCT TRANSFER APPARATUS

This application is a continuation-in-part of U.S. patent application Ser. No. 12/925,333 filed on Oct. 19, 2010 that claims benefit of U.S. Provisional Application Ser. No. 61/279,636 filed Oct. 23, 2009 pursuant to 35 USC §119(e).

FIELD OF THE INVENTION

This invention relates to food processing equipment, in particular, apparatus for preparing food for grilling on a roller grill.

BACKGROUND OF THE INVENTION

The use of a roller grilling apparatus is well known. Such devices as made by APW Wyott of Dallas, Tex., are able to grill more than five hundred frankfurters an hour. This makes this type of apparatus ideal for serving a large number of people quickly with a minimum number of personnel. Further, since the customers are able to view and smell the products while they are being grilled, it helps to develop appetite appeal so that it is no wonder that the use of such devices for serving 'hot dogs' is so ubiquitous.

The universal acceptance of having a grilled frankfurter prepared by such grills has resulted in their use for other food products as well, such as bratwurst, sausage, knockwurst and so on. However, many products taken directly from the refrigerator are not pre-cooked such as is typical for sausages. Therefore, such products are potentially hazardous if they spend too little cooking time on the roller grill before serving. This is particularly a problem in high volume situations where a large number of people are being served in a relatively short period of time such as at sporting events.

Health inspectors, recognizing the potential hazard to customers receiving food that has not been heated throughout to the proper temperature, have taken the position that the merchandizer of such products is in violation of health safety standards. Unless a consistently safe product can be demonstrably provided, the use of roller grills for products that aren't pre-cooked will to be very limited. This will be especially true in high volume locations for roller grills that often do not have sufficient time to heat the products fast enough to meet public demand such as at fairs, ballparks and other venues where the 'hot dog' is a signature food choice.

Heating such products on other than roller grills and then transferring them to a roller grill has disadvantages. First, this method often causes unwanted changes in the appearance and desirability of the product. Further, this method also requires additional equipment and presents a space problem during food preparation. Also, there is a requirement of moving the product from the non-roller grill to the roller grill which is located at a distance from the roller grill thus slowing the process as well as risking spills, etc.

A safe product transfer apparatus that is associated with a roller grilling apparatus and re-thermalizes the products to be roller grilled in accordance with food safety requirements and is able to hold such products for an extended time is not found in the prior art.

SUMMARY OF THE INVENTION

It is an aspect of the invention to provide a safe product transfer apparatus that is a low profile re-thermalization unit that also functions as a hold drawer.

It is an aspect of the invention to provide a safe product transfer apparatus that is associated with a roller grill such that products in the apparatus can be easily transferred to the roller grill as needed.

It is an aspect of the invention to provide a safe product transfer apparatus that features rear lateral bearings that keep the drawer centered underneath and enable the drawer to slide smoothly and prevent the drawer from binding on the inside of the heat cavity.

Another aspect of the invention is to provide a safe product transfer apparatus that is built into a roller griller with no loss of counter space.

It is still another aspect of the invention to provide a safe product transfer apparatus that features a stainless steel removable pan that permits interchange of the pan/tray wire rack options to tailor the drawer to specific roller grill products.

Still another aspect of the invention is to provide a safe product transfer apparatus that reduces waste from over cooked products that cannot be sold.

Still another aspect of the invention is to provide a safe product transfer apparatus that can heat a variety of food items at the same time.

Another aspect of the invention is to provide a safe product transfer apparatus that can heat a refrigerated product from 34° F. to greater than or equal to 140° F. in 35 minutes or less.

It is an aspect of the invention to provide a safe product transfer apparatus that has a heating cavity ranging from 250° F. to 425° F.

Another aspect of the invention is to provide a safe product transfer apparatus that can hold the products stored therein at a safe holding temperature but not hot enough to continue heating or degrading the food product.

Another aspect of the invention is to provide a safe product transfer apparatus that is able to hold products up to 6 hours without sacrificing the quality and appearance of the product.

It is an aspect of the invention to provide a safe product transfer apparatus that has a holding temperature ranging from greater than 140° F. to not more than 205° F.

It is still another aspect of the invention to provide a safe product transfer apparatus that has an openable drawer wherein heated products can be removed from the drawer and placed on a heated merchandizer such as a roller grill.

Another aspect of the invention is to provide a safe product transfer apparatus that has a control, preferably a digital control with push button operations.

Finally, it is an aspect of the invention to provide a safe product transfer apparatus that can fit under and/or fit between the legs of a roller grill.

DETAILED DESCRIPTION OF THE INVENTION

Figure 1:
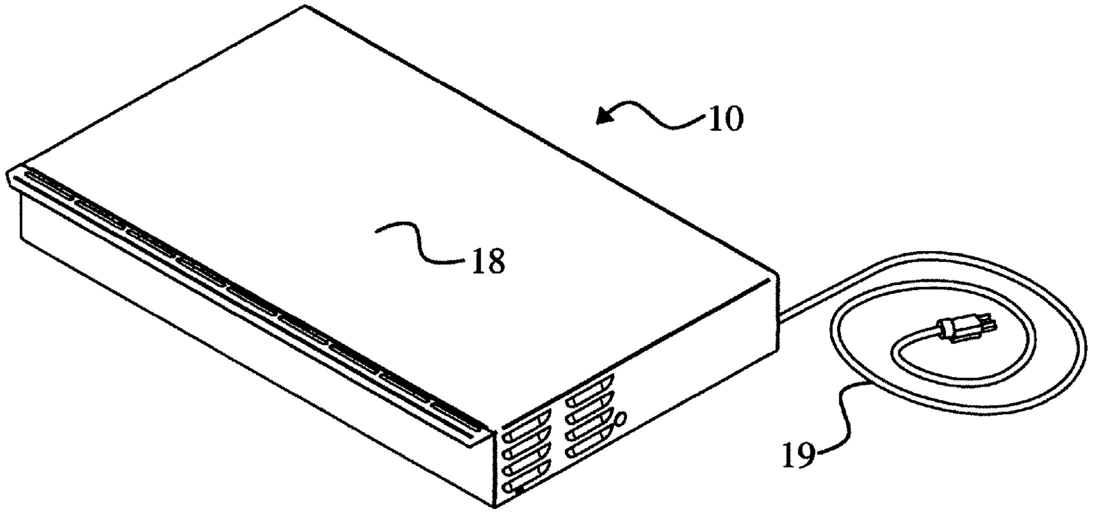
FIG. 1 is an isometric view of the safe product transfer apparatus with the drawer in the closed position in accordance with the invention.
Figure 2:
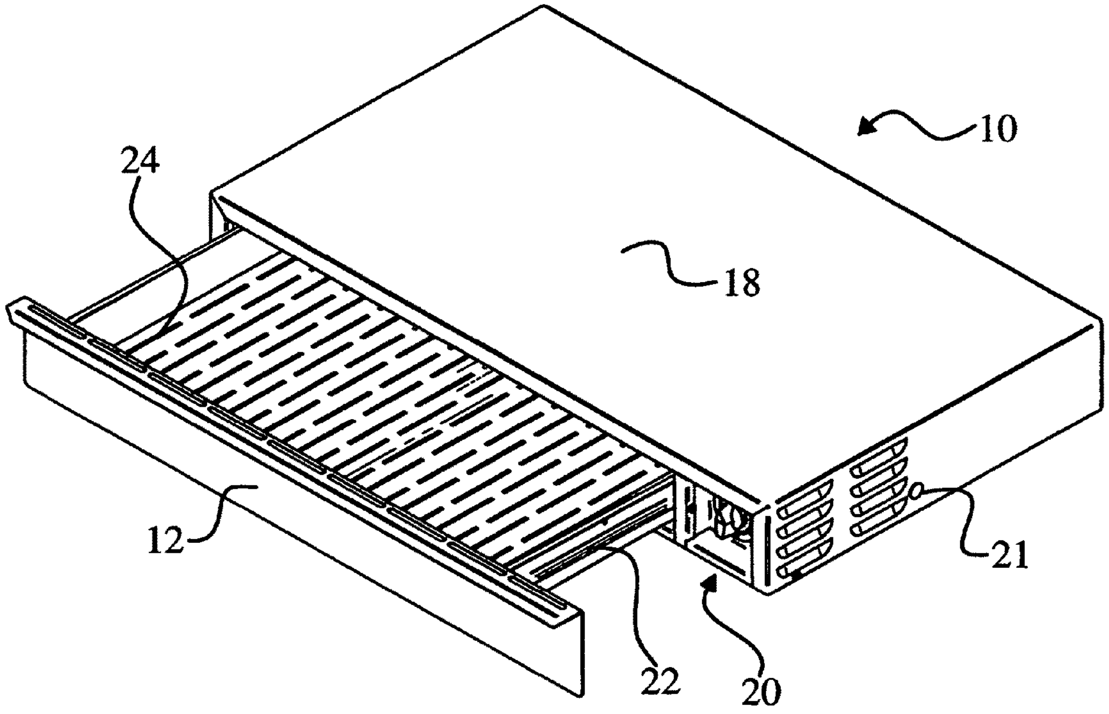
FIG. 2 is an isometric view of the safe product transfer apparatus with the drawer in the closed position in accordance with the invention.
Figure 3:
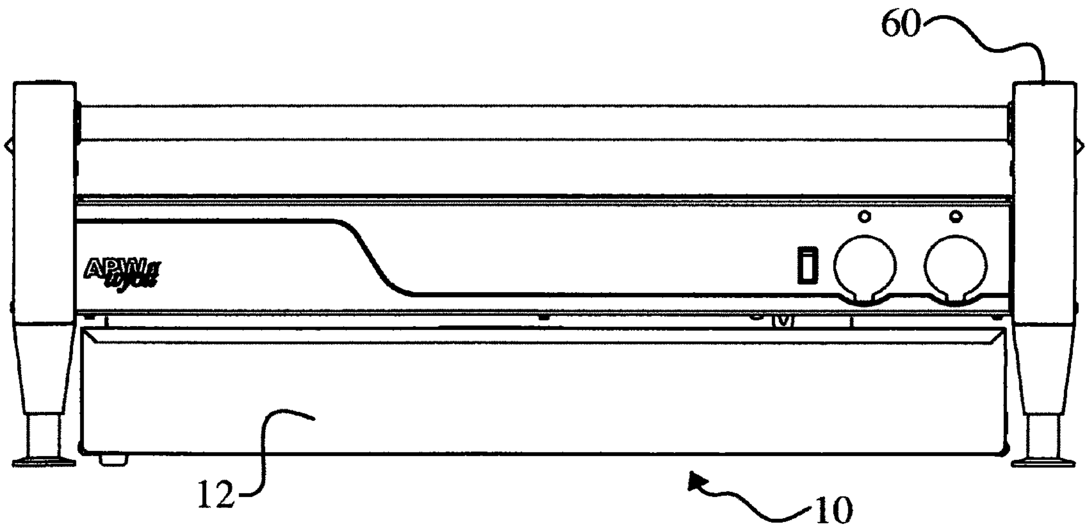
FIG. 3 is a front view of the apparatus underneath and between the legs of a standard roller grill.
Figure 4:
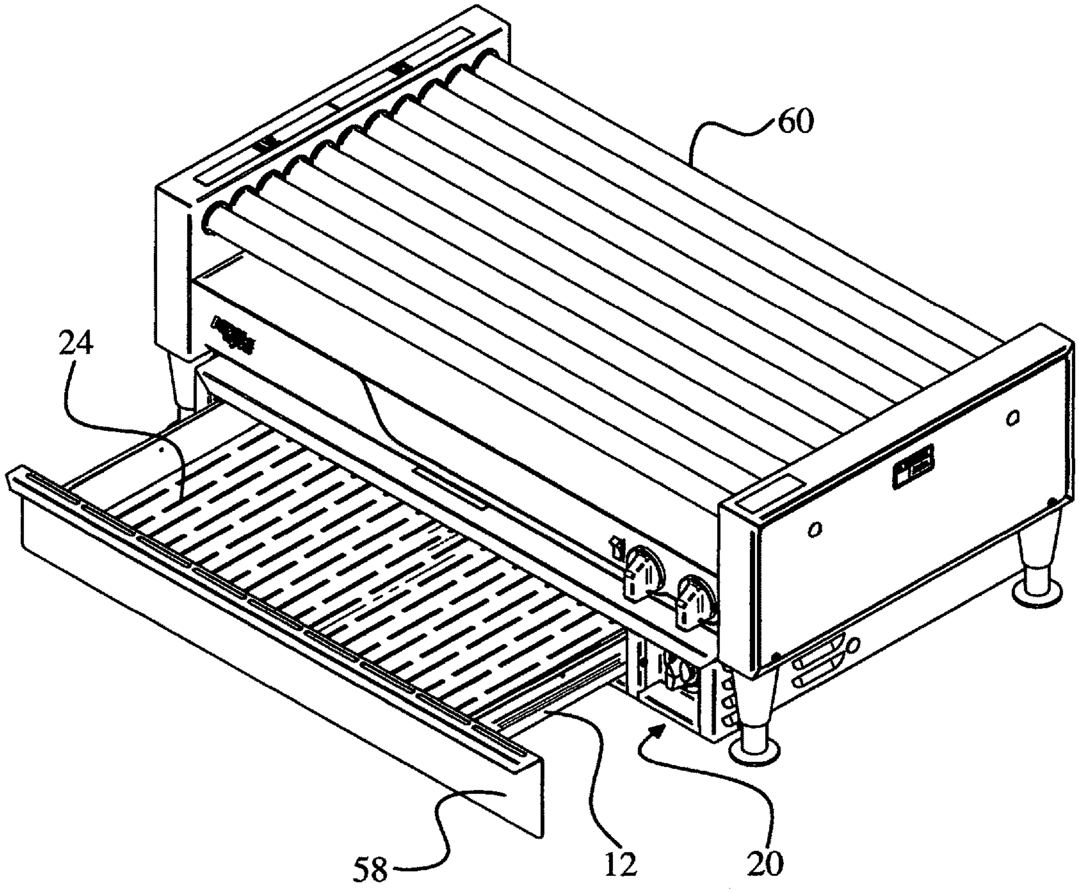
FIG. 4 is an isometric view of the apparatus with the drawer open underneath and between the legs of a standard roller grill.

Referring now to FIGS. 1 and 2, invention 10 is shown. Housing 18 is preferably made from stainless steel so that it can be used in cooking environments without rusting and requiring easy cleaning. Safe Product Transfer Apparatus (SPTA) 10 can be made in different sizes depending on the volume of food products that are to be served. It is anticipated that the smallest size will be about 19 inches wide, about 4¾ inches high, and 19 inches deep. SPTA 10 is powered by regular 120 volt, 60 Hz service via power cord 19. Drawer 12 is slid into SPTA 10 via rails 22. Inside drawer 12 is a stainless steel removable pan 24. One unique aspect of SPTA 10 is the ability to interchange the pan 24, tray/wire rack options to tailor the drawer 12 to specific roller grill products. SPTA 10 is designed as a stand-alone unit that can fit on a counter top (not shown) and between the legs (FIGS. 3 and 4) of a user's present roller grill 60, therefore, resulting in no loss of counter space no increase in overall height.

Figure 5:
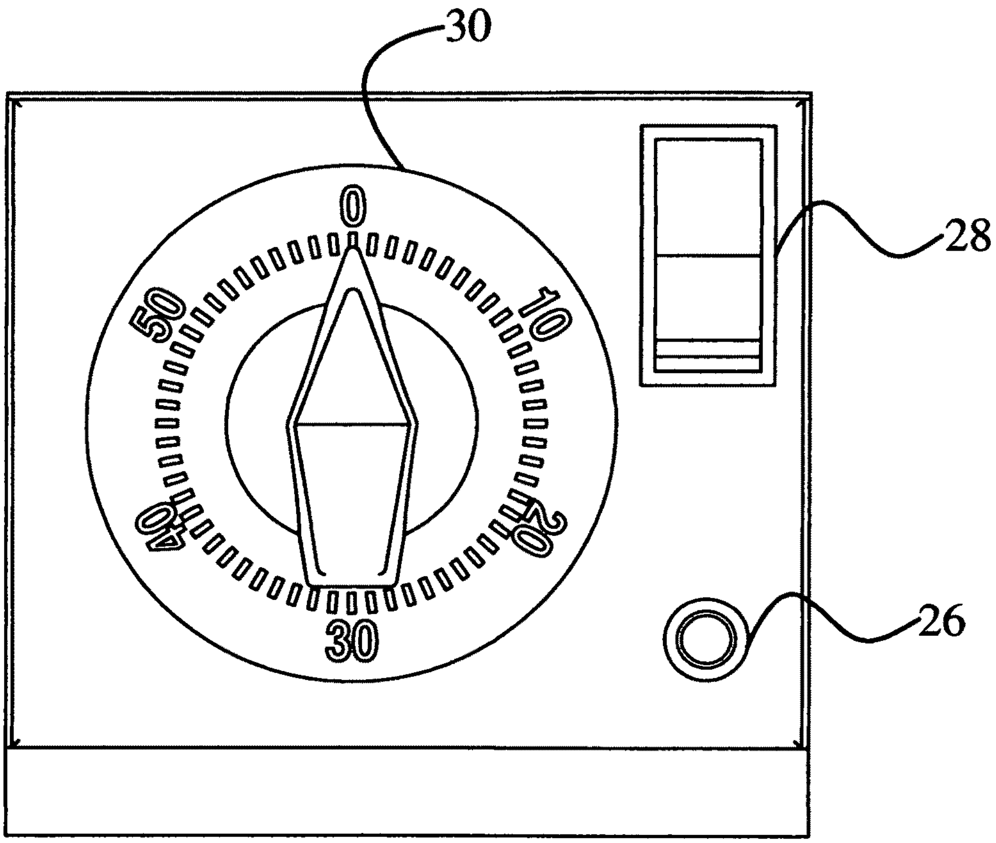
FIG. 5 is a detailed view of the control assembly.
Figure 6:
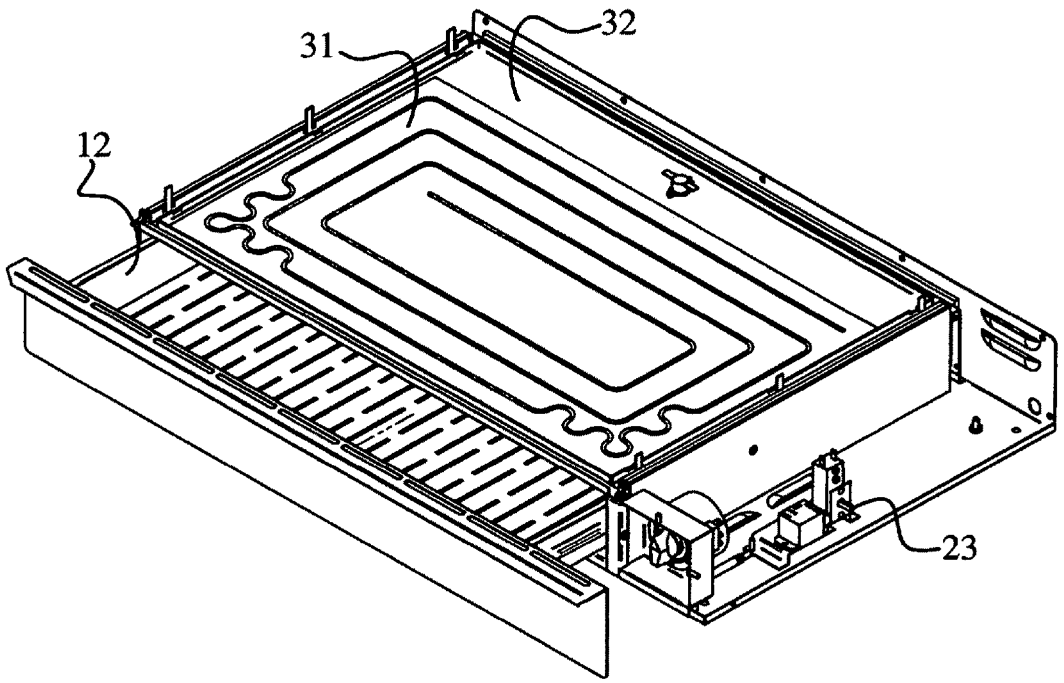
FIG. 6 is an isometric view of the apparatus showing the foil heater mat attached to the black anodized aluminum heat plate.
Figure 7:
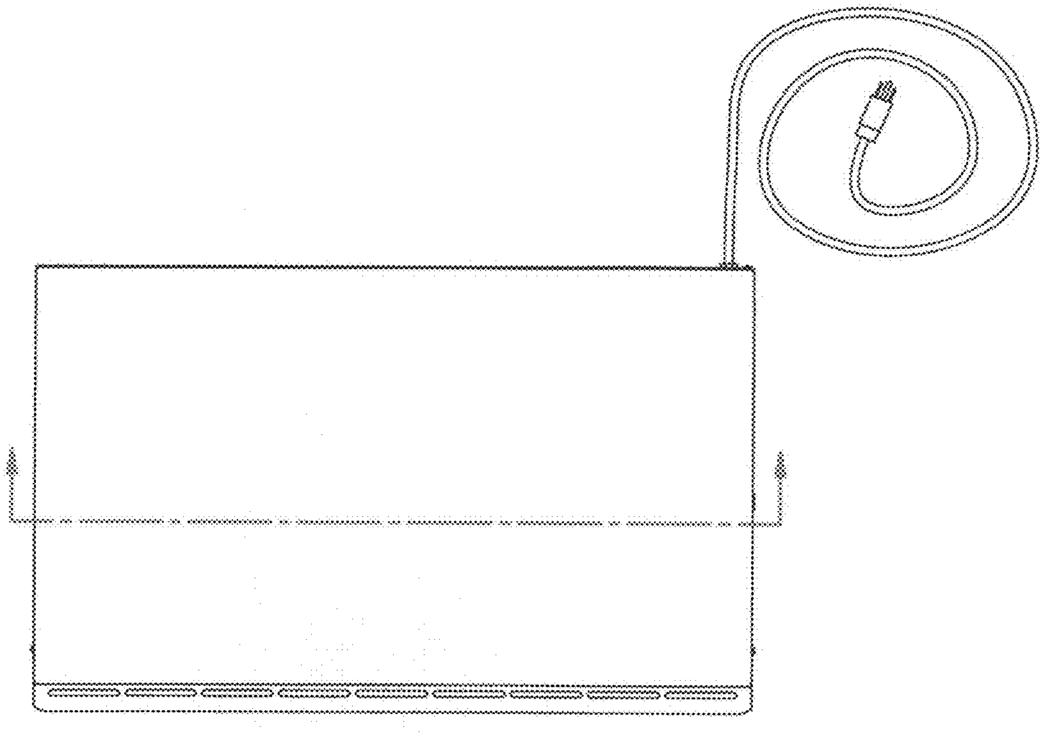
FIG. 7 is a top view of the apparatus with a section line drawn through the center.
Figure 8:
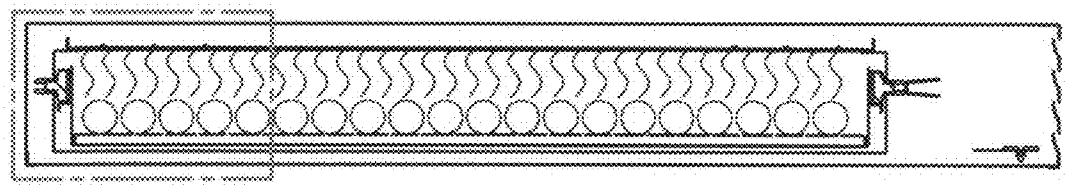
FIG. 8 is section view along the line drawn in FIG. 7
Figure 9:
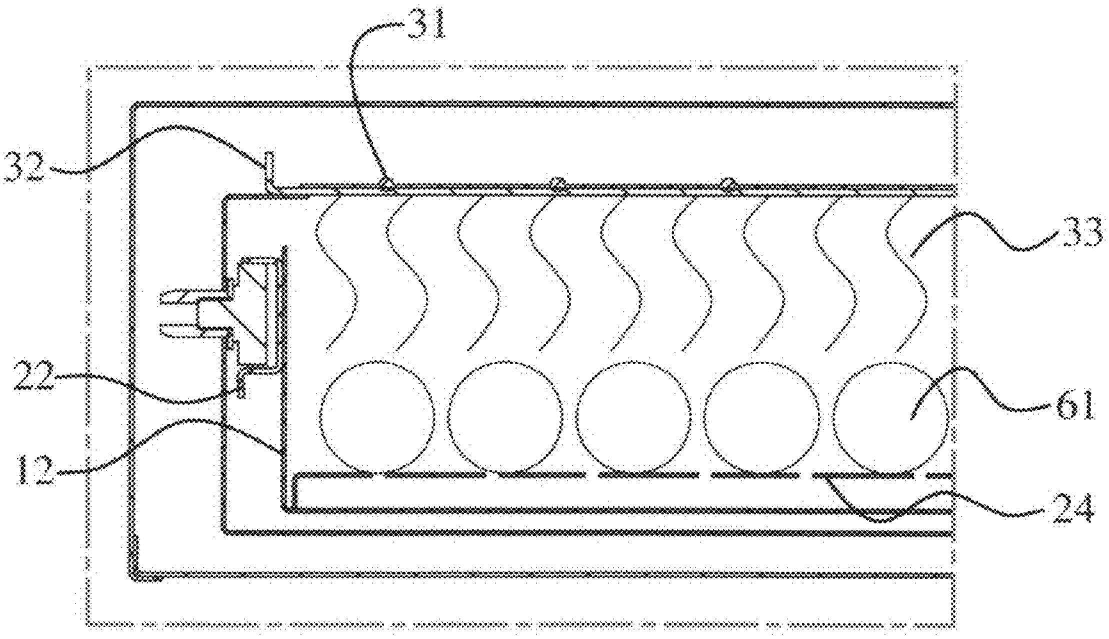
FIG. 9 is a detailed view from FIG. 8 depicting the black body radiant heat waves in relation to the roller grill product.

Referring now to FIG. 5, a detailed view of control assembly 20 is shown. This unit is designed with ease of operation being one of its attributes. This unit is able to heat/re-thermalize products such as hot dogs, bratwurst, knockwurst, kielbasa, sausage, etc. 61 and then automatically changes to "HOLD temperature" where products 61 them at the optimum temperature for a period of hours until they can be grilled on the associated roller grill 60. A variety of products 61 can BE placed in SPTA 10 at the same time and then brought to the optimum serving temperature so that they will look the freshest. This improves labor productivity by having pre-set holding times. Further, it ensures that product transfer from SPTA 10 to roller grill 60 will be swift, safe and meet governmental sanitary rules.

In operation, SPTA 10 is turned on via rocker switch 28. Once on, pilot light 26 is not lit but apparatus automatically goes into HOLD mode while the timer is at the zero position. To PREHEAT, the timer dial 30 is turned to 20 minutes and indicator light 26 becomes lit, signaling the user the HEAT mode has been initiated. HEAT mode will continue until the timer 30 times out to zero, at which time the SPTUA 10 will go into HOLD mode. After this initial 20 min PRHEAT period, the indicator light 26 will become un-lit, signaling the user is ready for food items 61 to be loaded.

After the food is loaded, the user turns the timer dial 30 to the desired heat time and indicator light 26 is lit steady. HEAT time will need to be determined by the user, as different types and quantities of food items 61 will have an effect on the overall time to heat food items 61 to safe temperatures. The timer 30 begins counting down from the set time until it reaches zero. When timer 30 reaches zero, the apparatus auto-advances to the "HOLD" mode at the "HOLD" temperature, again which pre-set, but can be adjusted depending on user requirements. By removing thermostat cover 21, the user can access the adjustable HOLD thermostat 23 to set their desired temperature.

Referring now to FIGS. 6, 7, 8 and 9, an exposed isometric view of the black body radiant heat source is shown. This is a unique feature of the SPTUA 10 as it provides a uniform heat distribution during the HEAT and HOLD cycles. Heater foil mat 31 is attached to a black anodized aluminum plate 32 with a high temperature adhesive. This assembly is then placed directly above drawer 12. The black anodized aluminum plate 32 and heater foil 31 create soft radiant energy 33 that is evenly distributed above the food items 61. This heat source makes it possible to HEAT food items 61 to desired temperatures while maintaining a temperature distribution of no more than 20° F. It also makes it possible to HOLD food items 61 with a temperature distribution of no more than 10° F.

Figure 10:
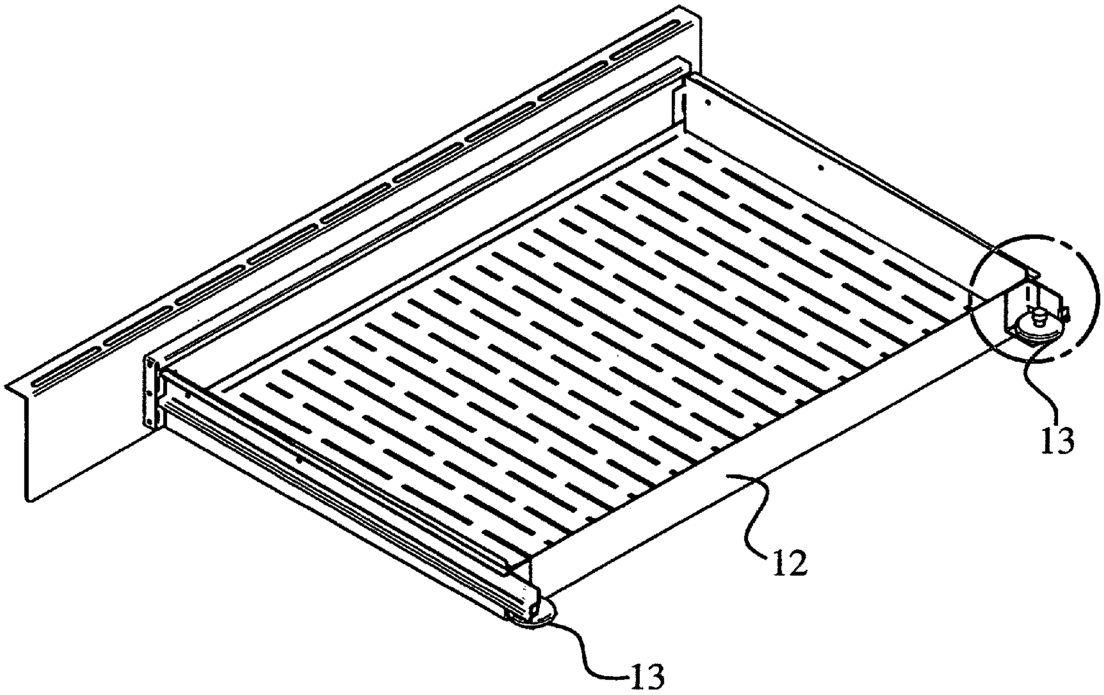
FIG. 10 is a rear isometric view of the drawer.
Figure 11:
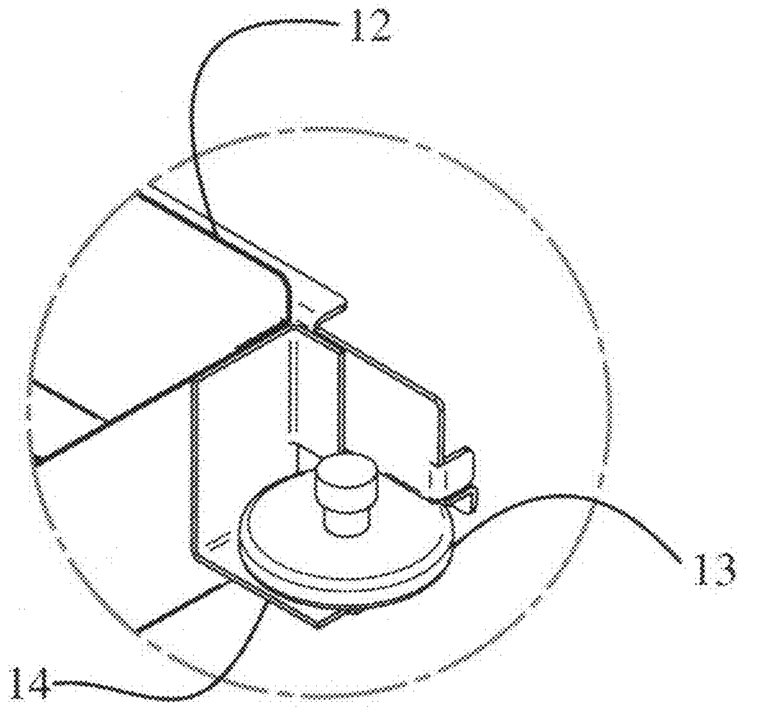
FIG. 11 is a detailed view of the lateral bearing.

Referring now to FIGS. 10 and 11, the isometric views of the drawer 12 design, this drawer has a unique feature in its rear lateral bearings 13. These rear lateral bearings 13 are attached to drawer 12 by means of a bracket 14. The bearings keep drawer 12 centered underneath the black anodized aluminum plate 32. They also enable drawer 12 to slide smoothly and prevent drawer 12 from binding on the inside of the heat cavity.

While certain representative embodiments of the invention have been described herein for the purposes of illustration, it will be apparent to those skilled in the art that modification therein may be made without departure from the spirit and scope of the invention.

What is claimed is:

1. A food product heating apparatus comprising:

a housing;

at least one operable drawer attached within said housing and adapted to hold a plurality of refrigerated food products that are to be heated to a pre-determined safe serving temperature;

a heat source place directly above said at least one operable drawer and attached within said housing to provide evenly distributed, controlled heat to plurality of refrigerated food products that can be held within said at least one operable drawer;

a control assembly having an on/off switch and a pilot light comprising:

a timer wherein said apparatus is set to a pre-determined time wherein said pilot light is illuminated indicating that a preheat mode has been initiated wherein said preheat mode continues until said timer counts down to zero; wherein once said timer reaches zero, said pilot light goes out indicating that a preheat temperature has been reached and said apparatus switches to a hold mode wherein said apparatus is ready for loading the plurality of refrigerated food products;

a nonadjustable heat thermostat that has a pre-set heat temperature used for when said timer is turned on and is counting down to zero, an adjustable hold thermostat that sets the temperature of the apparatus when said timer reaches or is set at zero such that said apparatus hold temperature a provides said preheat temperature to the preheat temperature such that said products are held at the pre-determined safe serving temperature.

2. The food product heating apparatus of claim 1 wherein said apparatus is associated with a roller grill so that the food products taken from said apparatus and placed on the roller grill to brown are assured of meeting health safety standards even if the food products are on the roller grill for insufficient time to otherwise heat the food products fast enough to meet consumer demands.

3. The food product heating apparatus of claim 2 where said apparatus is integrated into the roller grill wherein the food products can easily be transferred from said at least one operable drawer of said apparatus to the roller grill.

4. The food product heating apparatus of claim 2 wherein said apparatus is adapted to fit under the roller grill wherein the food products can easily be transferred from said at least one operable drawer of said apparatus to the roller grill.

5. The food product heating apparatus of claim 1 wherein the refrigerated food products can be heated from the refrigerated temperature to the heat temperature which is greater than or equal to 140° F. in 35 minutes or less.

6. The food product heating apparatus of claim 1 wherein said at least operable drawer has an operating temperature ranging from 250° F. to 425° F.

7. The food product heating apparatus of claim 1 wherein the maximum time for holding the food products at the hold temperature is up to 6 hours.

8. The food product heating apparatus of claim 1 where said apparatus is associated with a heated food product merchandiser.

9. The food product heating apparatus of claim 1 where the hold temperature ranges from greater or equal to 140° F. to not more than 205° F.

10. The food product heating apparatus of claim 1 further comprising a first alarm and a ready indicator light that indicates the apparatus is ready to be loaded with food products.

11. The food product apparatus of claim 1 further comprising a pair of rear lateral bearings for keeping said operable drawer centered and enables the drawer to slide smoothly and prevents the drawer from binding on the inside of the heat cavity.

12. The food product apparatus of claim 1 wherein said heat source comprises:

a black anodized aluminum plate;

a heater foil mat attached to said black anodized aluminum plate.

13. The food product apparatus of claim 12 wherein said heater foil mat is attached to said black anodized aluminum plate with high temperature adhesive.

14. The food product apparatus of claim 1 wherein said heat source evenly distributes the heat via radiant energy maintaining a temperature distribution of no more than 20 degrees Fahrenheit.

15. The food product apparatus of claim 1 wherein said heat source holds the food products held within said at least one operable drawer with a temperature distribution of no more than 10 degrees Fahrenheit

* * * * *